(12) United States Patent
Van Alphen (10) Patent No.: US 12,364,258 B2
(45) Date of Patent: Jul. 22, 2025

(54) AGRICULTURAL DEVICE AND METHOD FOR DISPENSING A LIQUID

(71) Applicant: EXEL INDUSTRIES, Paris (FR)

(72) Inventor: Martinus Henricus Van Alphen, Tilburg (NL)

(73) Assignee: EXEL INDUSTRIES, Paris (FR)

(*) Notice: Subject to any disclaimer, the term of this patent is extended or adjusted under 35 U.S.C. 154(b) by 1004 days.

(21) Appl. No.: 17/432,531

(22) PCT Filed: Feb. 21, 2020

(86) PCT No.: PCT/EP2020/054650
§ 371 (c)(1),
(2) Date: Aug. 20, 2021

(87) PCT Pub. No.: WO2020/169817
PCT Pub. Date: Aug. 27, 2020

(65) Prior Publication Data
US 2022/0142142 A1   May 12, 2022

(30) Foreign Application Priority Data
Feb. 21, 2019   (NL) ...................................... 2022612

(51) Int. Cl.
*A01M 7/00*   (2006.01)
(52) U.S. Cl.
CPC .................................. *A01M 7/0089* (2013.01)
(58) Field of Classification Search
CPC .................................................. A01M 7/0089
(Continued)

(56) References Cited

U.S. PATENT DOCUMENTS

| 5,913,915 A | * | 6/1999 | McQuinn | ............. | A01C 23/007 |
| | | | | | 701/50 |
| 8,849,523 B1 | * | 9/2014 | Chan | .................... | A01G 25/167 |
| | | | | | 701/50 |

(Continued)

FOREIGN PATENT DOCUMENTS

| AU | 2011211346 A1 | 9/2011 |
| BE | 833401 A | 12/1975 |

(Continued)

OTHER PUBLICATIONS

The First Search Report dated Sep. 7, 2022, for Chinese Patent Application No. 202080029867.3 (two (2) pages).

(Continued)

*Primary Examiner* — Mahmoud S Ismail
(74) *Attorney, Agent, or Firm* — KDW Firm PLLC (57) ABSTRACT

An agricultural device and method for dispensing a liquid product to be sprayed over a surface, such as an agricultural field. The agricultural device includes a boom having a longitudinal supply line for transporting the liquid product and a plurality of nozzles, a pressure regulation unit for controlling the opening and closing of one or more associated nozzles, a positioning system to provide position data, where the position data comprises a real-time position of the agricultural device and a time stamp, a detection system positioned on the boom and/or in front of the agricultural device and is configured to provide detection data comprising information on the surface to be sprayed, and a map generator to, based on the detection data and position data, generate a raster-based representation of the surface, the representation comprising a number of raster elements, where each raster element includes position data associated with that raster element.

19 Claims, 6 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 2012/0237083 | A1* | 9/2012 | Lange | G06F 16/29 |
| | | | | 382/103 |
| 2013/0153676 | A1 | 6/2013 | Ballu | |
| 2013/0292487 | A1* | 11/2013 | Ballu | A01M 7/0042 |
| | | | | 239/71 |
| 2016/0044862 | A1 | 2/2016 | Kocer | |
| 2016/0309647 | A1 | 10/2016 | Bittner | |
| 2017/0318743 | A1* | 11/2017 | Sauder | B60K 35/22 |
| 2018/0306914 | A1* | 10/2018 | Chan | A01C 7/102 |

FOREIGN PATENT DOCUMENTS

| | | |
|---|---|---|
| CN | 1070080 C | 3/1993 |
| CN | 1461540 A | 12/2003 |
| CN | 102428904 A | 5/2012 |
| CN | 102507506 A | 6/2012 |
| CN | 102696032 A | 9/2012 |
| CN | 103096714 A | 5/2013 |
| CN | 103366015 A | 10/2013 |
| CN | 105217038 A | 1/2016 |
| CN | 105557666 A | 5/2016 |
| CN | 106202212 A | 12/2016 |
| CN | 106882380 A | 6/2017 |
| CN | 108605923 A | 10/2018 |
| CN | 108777938 A | 11/2018 |
| CN | 108873888 A | 11/2018 |
| EP | 0761084 A1 | 3/1997 |
| EP | 1167095 A1 | 1/2002 |
| GE | P20084536 B | 11/2008 |
| RU | 2676319 C1 | 12/2018 |
| WO | 9001265 A1 | 2/1990 |
| WO | 2012007549 A1 | 1/2012 |

OTHER PUBLICATIONS

The First Search Report dated Sep. 22, 2022, for Chinese Patent Application No. 202080029814.1 (two (2) pages).
International Search Report and Written Opinion for the International Patent Application No. PCT/EP2020/054650, mailed Mar. 23, 2020, 14 pages.

* cited by examiner

AGRICULTURAL DEVICE AND METHOD FOR DISPENSING A LIQUID

This is a national stage application filed under 35 U.S.C. § 371 of pending international application PCT/EP2020/054650, filed Feb. 21, 2020, which claims priority to Netherlands Patent Application No. NL 2022612, filed Feb. 21, 2019, the entirety of which applications are hereby incorporated by reference herein.

The present invention relates to an agricultural device for dispensing a liquid and a method for dispensing a liquid product using such a device over a surface to be sprayed, such as an agricultural field. The present invention is applicable in the agricultural field in order to spray a field with a liquid phytosanitary product, such as a fertilizer, a pesticide, or other type.

Agricultural devices for dispensing a liquid over a surface of a field, such as an agricultural field, are known from practice. Such devices comprise a spray boom or, in short, a boom comprising a number of consecutive ducts for transporting the liquid to be dispensed. The consecutive ducts together form a longitudinal supply line from a liquid product supply to spray nozzles that are positioned on the boom. The spray nozzles are configured to dispense the liquid product on a target, which can be formed by plants (including crops and weeds), that are positioned on an agricultural field that is to be sprayed. Often, the distance between the nozzles and the targeted object is approximately 25 cm, 37.5 cm, or 50 cm to obtain a good spraying result.

During operation, liquid product is extracted from a product supply, such as a storage tank, and subsequently pumped via the longitudinal supply lines formed by the ducts to the spray nozzles, or nozzles. To ascertain a constant overall flow rate of sprayed liquid product per treated surface unit, the pressure in the longitudinal supply lines needs to be proportional to the square of the speed of travel of the boom (and thus the device) along a distance of the agricultural field. This is often achieved using one or more bypass valves and/or different supply lines to maintain the required pressure over the entire length of the longitudinal supply lines. A conventional boom may be up to 36 m long, or even 55 m, which requires significant technical measures to maintain pressure in the longitudinal supply lines over the entire length thereof.

In order to reduce both the environmental impact and the costs involved with spraying fields, a need has arisen to increase control over the amount and location of the liquid that is to be dispensed.

To solve this problem, one or more detection systems can be mounted on the agricultural device, which may detect plants in front of the boom. Upon detection of a plant to be sprayed, a control unit of the device will initiate one or more spraying nozzles associated with the detection system to start dispensing which are in line with the detected plant upon detection when the agricultural machine has moved a predetermined distance. The predetermined distance is based on the distance between the field of view of the detection system and the boom as well as the traveling speed of spraying nozzles, and boom height.

A disadvantage of the abovementioned device is that the system often leads to mismatches between the expected position of the boom and the actual position of the boom at the moment of dispensing. This is mainly due to inherent deviations of the device with respect to for example the route and movement speed, but also movements of the boom, for example a jaw. As a result, the plants to be sprayed are missed, whereas plants that should not be sprayed are sprayed. A solution could be provided by (greatly) increasing spraying margins, e.g. a larger surface area is associated with a detected plant. This solution would lead to an increase in the spray rate of the plants to be sprayed but would also increase the number of plants that are sprayed that should not be sprayed.

The present invention aims to obviate or at least significantly reduce the aforementioned problems by providing a device that is capable of more accurately dispensing of a liquid product.

To that end, the invention provides an agricultural device for dispensing a liquid product to be sprayed over a surface, such as an agricultural field, the device comprising:

at least one boom comprising a longitudinal supply line for transporting the liquid product and a plurality of nozzles that are positioned along the boom, wherein each nozzle is operatively connected to the longitudinal supply line and has a nozzle dispensing range;

a liquid product supply that is connected to the longitudinal supply line for supplying to the longitudinal supply line the liquid to be sprayed;

a pressure regulation unit including at least one nozzle control unit that is configured for controlling the opening and closing of one or more associated nozzles to dispense liquid on the nozzle dispensing range associated with said nozzles;

a positioning system that is configured to provide position data, wherein the position data comprises a real-time position of the agricultural device and a time stamp;

a detection system that is positioned on the boom and/or in front of the agricultural device and is configured to provide detection data comprising information on the surface to be sprayed;

a map generator that is operatively connected to the detection system and the positioning system for respectively receiving detection data and position data, wherein the map generator is configured to, based on the detection data and position data, generate a raster-based representation of the surface, the representation comprising a number of raster elements, wherein each raster element includes position data and detection data associated with that raster element;

a memory that is configured to store the raster-based representation;

wherein the pressure regulation unit and/or the at least one nozzle control unit are operatively connected to the positioning system and the memory and are further configured to:

receive real-time position information from the positioning system;

select, based on the real-time position information, the raster-based representation, and the position of the nozzles relative to the real-time position information, for each raster element a nozzle that is associated with that raster element at a specific time; and, open the selected nozzle to dispense a quantity of liquid to the surface associated with that raster element at the specific time.

It is noted that the detection data comprising information on the surface to be sprayed may contain one or more of dispensing targets, such as plants or weeds, soil type, a temperature indication, growth stage of a crop, other soil data and more.

It will be understood that the terms such as spraying target, spraying object, dispensing target etc. will be used interchangeable in the context of the invention.

It is further noted that in the context of the invention the raster-based representation of the surface could comprise any representation that can partition the surface of a field in a continues and non-overlapping manner such as a mesh, a raster, and other polygon based representation.

An advantage of the device according to the invention is that the selection of the nozzle to dispense the liquid is based on real-time position information as well as the detection information that is implemented in the raster-based representation. In other words, at the moment of dispensing, the (real-time) position of the device is checked to establish that the correct quantity of liquid is sprayed at the current location. This is achieved by selecting, based on the position and the representation, the nozzle that is positioned over the specific raster element that is to be sprayed and controlling the nozzle to spray the quantity of liquid associated with the specific raster element.

Another advantage of the device according to the invention is that the representation, and more specifically the raster elements thereof, can be stored for subsequent use. The raster elements contain specific information on the plants that are detected on that specific raster element, such as the number of different plants that are present within the area that the raster element represents, the type of plants contained etc. and may also contain other relevant information for the specific area that the raster element represents.

Yet another advantage of the raster based representation is that the map allows an in-detail analysis of the conditions across the field by analyzing differences between different raster elements. It is preferred that the raster based representation is, to that end, transmitted to a remote device, such as a computing device of a farmer, such that the data can be analyzed using appropriate software. Such analysis may improve the yield even further.

It is noted that the position of the device as mentioned above may be an 'absolute' or global position, for example determined by a global positioning system (GPS), yet may also constitute a relative position on the field that may be determined using (local) markers or a position relative to the agricultural device.

It is further noted that, for the purpose of the invention, the term 'spraying range' should be read as an area on which the nozzle is capable of dispensing. The term spraying range may therefore also be understood as encompassing similar wording such as spraying surface, spatial range, spatial spraying range or spatial spraying surface. It defines a spatial location, which is determined by the nozzle and/or the distance of the nozzle with respect to a field to be sprayed. It as such therefore refers to a (mostly) cone- or pyramidically shaped form having an apex near the nozzle opening from which the liquid is dispensed.

It is also noted that the detection system is positioned on the boom and/or at the front of the agricultural device, when for example other elements of the agricultural device are (partly) in front of the boom.

In an embodiment the pressure regulation unit and/or the nozzle control units are further configured to obtain the position of the nozzles relative to the position of the agricultural device by combining the layout of the nozzles along the boom together with a dynamic boom model and/or boom-sensor data.

In a further embodiment, the agricultural device comprises one or more boom-positioning units positioned on each boom and configured to collect the boom-sensor data and send the boom-sensor data to the pressure regulation unit and/or nozzle control units.

It is noted that the boom-positioning system comprises, for example, a global positioning system or a local positioning system.

In another further embodiment, the agricultural device comprises one or more gyroscopes configured to collect the boom-sensor data and send the boom-sensor data to the pressure regulation unit and/or nozzle control units.

Due to movements of the boom like yawing, swaying and other movements the position of the nozzles changes relative to the center of the agricultural device. In other words, the position of the nozzles relative to the center of the agricultural device is not static, but dynamic. By obtaining the position of the nozzles relative to the position of the agricultural device, their position information can be used to adapt for movements of the boom relative to the device, leading to a higher spraying accuracy.

In an embodiment according to the invention, the detection data may comprise information on one or more of plants, such as weeds and crops that are detected to be sprayed, soil type, moisture level, temperature of the soil etc.

The detection system may be configured to collect all types and kinds of information that is relevant to the growth of the plants on the field, and therewith the yield of the field. This may include information on the plants, most notably the crops and the (undesired) weeds, yet may also include relevant information on the field itself, such as the soil status. Soil status may include temperature, moisture level and even soil type.

It is noted that the raster-based representation may be a representation that is generated in-situ or may be pre-generated representation that is updated by means of the map generator during operation of the agricultural device. Such a pre-generated map may for example constitute the data for that specific field that was collected during an earlier season and only requires to be updated to the present circumstances. It may also be that the pre-generated representation is made during a map generating step that is performed by the farmer at the start of a season.

It is also noted that the raster-based representation of the surface may represent the position information of the raster elements as a global position, a position relative to the field using (local) markers to denote an origin, or a position relative to the agricultural device.

In an embodiment according to the invention, the raster-based representation is stored by the map generator in the memory.

In an embodiment according to the invention, the raster element further includes detection data and wherein the pressure regulation unit and/or the at least one nozzle control unit calculate the quantity of liquid to be sprayed for each raster element based on at least the detection data associated with the raster element.

It is noted that the detection data may comprise one or more plant characteristics, such as, a plant type, a plant size, a plant growth stage, a plant defect that are detected.

It is further noted that the one or more plant characteristics may be individually determined for each plant present in the detection data.

By calculating the quantity of liquid to be sprayed based for each raster element on at least the detection data the quantity of liquid to be sprayed can be adapted based on the detected plants, soil type, growth stage etc. This has as advantage that the quantity of liquid is adapted to be most suitable to the local circumstances in each raster element.

In an embodiment according to the invention, the detection system may comprise a plurality of image recording devices positioned along the boom and/or in front of the agricultural device, wherein each of the plurality of image recording devices is configured capture images of a part of the surface, and an image processing device connected to the plurality of image recording devices, wherein the image processing device is configured to receive and process images from the plurality of image recording devices, wherein the processing comprises identifying plants, such as crops and weeds, on the captured images, and wherein the map generator is configured to associate each of the identified plants with a raster element in the map.

An advantage of using a camera-based detection system having an image processing device is that the number and/or types of plants can be easily detected based on image recognition software. This allows a more specific treatment of the surface of the field by adapting the liquid to the specific needs for one or more of the raster-based elements in the representation.

By adapting the (amount of) liquid to the specific needs for one or more of the raster-based elements in the representation, the amount of liquid can be adapting on a plant based level, thus preventing from "under spraying" or "over spraying" on individual plant level.

Another advantage is that, by associating each of the identified plants with a raster element in the map, and by selecting, based on the real-time position information, the raster-based representation, and the position of the nozzles relative to the real-time position information, for each raster element a nozzle that is associated with that raster element at a specific time, each of the identified plants will receive the correct dose of liquid, independent of movements of the agricultural device and/or boom, such as making a turn or swaying of the boom, between the moment of detection and the moment of spraying.

Another advantage of using a camera-based detection system is that the captured images may be transmitted to one or more remote systems, such as computing devices, on which they can be analyzed. Especially when storing images of subsequent runs during a period of time, the operator or user may obtain a chronological sequence of images that displays the development of his crops and/or weeds on the field. Due to the plurality of cameras and the link between the captured images and the raster elements, a detailed map of the field can be generated of which the development over time can also be displayed.

In an embodiment according to the invention, the image recording devices may be thermal image devices configured capture thermal images.

Additionally or alternatively, the image recoding devices may also capture thermal images, which allow for example plant and soil temperature to be detected. An advantage thereof is that the plants may be sprayed more often if a high soil temperature is detected. Furthermore, plant temperature can be a factor in detecting plant health.

It will be understood that besides image recording devices and thermal image recording devices, other recording devices such as multispectral camera devices or even hyperspectral camera devices could also part of possible embodiments of the invention and the term image recording devices can be read to encapsulate all such types of cameras and embodiments.

In an embodiment according to the invention, the image processing device may further be configured to compare the identified plants with plant type information stored in the memory to provide each of the identified plants with a plant label, and/or determine the number of plants on each of the captured images, and wherein the map generator is configured to include in each of the raster elements the number of plants and/or the plant labels associated with that raster element.

An advantage of including specific information, such as the number and type of plants present in a specific area, in the raster element associated with that area is that a more detailed agricultural development plan for that field may be designed. More specifically, it has the advantage that the amount of liquid dispensed to a raster element can be based very specific for the number and type of plants detected in that area. This allows an area having an increased growth of (undesired) weeds to receive a higher dose of herbicide, whereas areas having little or no weed growth do not receive such herbicide. Thus, a more tailored development of the field is therewith possible.

In an embodiment according to the invention, the memory may be configured to store additional plant type information, wherein the image processing device may be configured to compare the identified plants with the stored plant type information to provide an operator with additional information, such as the required liquids to be applied for those plants.

An advantage of containing more detailed information on plants and plant types in the memory is that the memory, preferably in combination with the map generator and/or the pressure regulation unit, may be used to provide feedback to the operator that includes suggestions for development of the field, such as suggestions with regard to the liquid to be used.

In an embodiment according to the invention, the pressure regulation unit and/or the nozzle control units may be configured to calculate for each raster element, and based on the number of plants and/or the plant labels, a quantity of liquid to be dispensed to that raster element.

It is preferred that the quantity of liquid dispensed to a specific area that is represented by a raster element is as accurate as possible for that raster element. It is therefore advantageous to configure the pressure regulation unit and/or the nozzle control units to use the specific information on number and type of plants to calculate the required quantity of liquid that needs to be dispensed.

In an embodiment according to the invention, each of the plurality of image recording devices may be configured to capture images of the surface area that, when viewed in a moving direction of the agricultural device, is positioned in a range of 4-6 meter in front of the boom, and have a width in the range of 2-3 meter.

By positioning the image recording devices such that the capture image of the surface with a width in a range of 2-3 meter a good balance between the number of required cameras and the required detail for the images is struck. Furthermore, the captured surface is preferably situated 4-6 meter in front of the boom in order for the image processing device to be able to process the captured images before the nozzles are in reach of the captured surface. It will be understood that faster image processing devices would allow for the capturing of the surface situated at a shorter distance from the boom.

In an embodiment according to the invention, each of the plurality of image recording devices may have a frame rate between 1 to 60 frames per second, and preferably have a frame rate of between 6 to 15 frames per second.

The mentioned frame rate provides a fair balance between the technical complexity of the cameras and the required detail of the captured images.

In an embodiment according to the invention, each raster element may correspond to a surface area of the surface in the range of 5-50 centimeter by 5-50 centimeter, and wherein the surface area is preferably around 15 by 15 centimeter.

In a further embodiment according to the invention, the surface area is determined based on or more of a plant characteristics, distance between nozzles and/or spraying range.

It is noted that plant characteristics may comprise, for example, plant type, plant size, or a relative distance between plants.

In order to provide sufficient detail to the raster-based representation, the raster elements are preferably chosen as small as possible. Conversely, too much detail would require an expensive system and may additionally obfuscate the broader picture that is required to obtain the necessary and desired treatment. By choosing the size of the raster elements in the range of 5-50 cm for each side, a fair balance is struck between the required detail and the need for providing an affordable device.

In an embodiment according to the invention, the nozzles may be placed on the boom with a distance between the nozzle between 25 and 50 centimeters.

In an embodiment according to the invention pressure regulation unit and/or the at least one nozzle control unit is further configured to store numeric values, such as a quantity of liquid, in the memory using a range index (as opposed to storing the numeric value directly), wherein the range index is a natural number taken from a range of N index numbers between zero and N−1 wherein:
  each index number is associated with a distinct block (or range) of numeric values;
  range index zero corresponds to a predetermined block of lowest numeric values;
  range index N−1 corresponds to a predetermined block of highest numeric values;
  the range index associated with a numeric value corresponds to the range index of the block the numeric value falls into; and,
  each type of numeric measurement has an associated predetermined range stored in the memory.

By storing the range index associated with a numeric value in the memory instead of storing the numeric value directly, the amount of storage needed is reduced, since the numbers of bits needed to represent the numeric value in the memory is equal to the number of bits needed to represent the number N−1 (as opposed to using a floating point number or an integer based representation which often uses 32 or even 64 bits). To illustrate, given a set of predetermined blocks 0-10, 10-20, 20-30 and corresponding range index numbers 0, 1, and 2 for some type of measurement and a numeric value 9.56 of the same type of measurement, this value is represented in memory using the range index 0.

Note that since this reduction in storage space is obtained for each raster element, the advantages of the representation as above increases when the size of the raster elements is reduced (and thus more raster elements are used).

In a preferred embodiment the memory is configured to store a value of a quantity of liquid corresponding to a raster-element using one byte by using an associated predetermined range wherein N is 256.

It is preferred to minimize the amount of data that is stored and/or send to a remote device, while simultaneously keeping sufficient details in the storage for the required purpose. In view of the invention, it is found possible to reduce the amount of data for each raster element to a single byte of memory.

In an embodiment according to the invention, the agricultural device may further comprise a communication device that is configured to communicate with a remote device, preferably a computing device having a receiving and sending module, one or more of detection data, position data, the raster-based representation and/or a quantity to be sprayed on a surface corresponding with a raster element and/or a quantity sprayed on a surface corresponding with a raster element.

An advantage of providing a communication module is that the device data may be accessed remotely, wherein device data can for example comprise device state data, position data, operational data, and/or data relating to the rasterized representation, spraying information, and detection information. In addition, some software elements in the device may be serviced remotely, therewith reducing the maintenance time for the device. This is especially true, when the (remote) maintenance is performed during off-time (i.e. standstill periods) of the device.

In an embodiment according to the invention, the pressure regulation unit and/or the nozzle control units may be configured to, after dispensing a quantity of liquid to the surface associated with a raster element, send to the map generator a message including information on the quantity of liquid dispensed to the surface associated with the raster element, and wherein the map generator is configured to include said information on the quantity in said raster element.

To provide an even more tailored quantity of liquid to the field, each raster element of the raster-based representation may be updated after it has received an amount of liquid. This means that the raster-based representation at each moment in time contains the most actual data regarding the status. Moreover, it also allows the status to be monitored over a period of time, which may give rise to a more detailed analysis of crop development over time.

In an embodiment according to the invention, the amount of liquid dispensed may be compared against a fixed maximum benchmark for dispensing that is stored in the memory, such that, at any given time period, the maximum quantity of liquid that is allowed to be sprayed is not exceeded.

In an embodiment according to the invention, the agricultural device further may comprise a user interface, such as a graphical user interface (GUI), that is operatively connected to the memory, wherein the interface is configured to enable a user to select a specific type of plant to be sprayed from a list of plants stored in the memory, and wherein preferably each plant type on the list of plants is associated with a quantity of liquid adapted to that plant type.

It is preferred that the device includes a user interface that allows the operator to track and/or influence the process during operation. The user interface may be configured to provide direct or indirect access to one or more of the components of the device, such as the pressure regulation unit, the memory and/or the map generator.

In an embodiment according to the invention, the agricultural device may further comprise a display configured to display one or more of dispensing information, wherein dispensing information comprises the raster-based representation of the surface and/or quantity of liquid to be dispensed.

In an embodiment according to the invention, the nozzles comprise a PWM-valve.

In an embodiment according to the invention, the agricultural device may comprise connection means for connecting digital devices, such as a computing device, wherein the connection is configured for uploading information to the memory and/or the detection system.

An advantage of providing connection means for digital devices is that the agricultural device may be updated in a quick and efficient manner by connecting a digital device and uploading the necessary software. In addition, the connection may also be used to download data from the device, for example in order to perform maintenance actions on the device.

Also, several other data, such as maximum dispensing quantities and/or a database with plant data for a specific field or type of crop.

The invention also relates to a method for dispensing a liquid product to be sprayed over a surface, such as an agricultural field, the method comprising the steps of:

providing an agricultural device according to any one of the preceding claims;

moving the agricultural device over a field to be sprayed;

generating, by the positioning system, position data comprising a real-time position and a time stamp;

generating, by the detection system, detection data comprising information on the surface to be sprayed;

generating, by the map generator and based on the position information and the detection information, a raster-based representation of the surface, the representation comprising a number of raster elements, wherein each raster element includes position data associated with that raster element;

selecting, by the pressure regulation unit and/or the nozzle control units, based on the real-time position information and the raster-based representation, for each raster element a nozzle that is associated with that raster element at a specific time; and opening for a predetermined time period the selected nozzle to dispense a quantity of liquid to the surface associated with that raster element at the specific time.

The method according to the invention provides similar effects and advantages as the device according to the invention. More specifically, the method according to the invention allows the quantity of liquid to be dispensed to the field to be highly accurate, even if the device deviates of the forward route and/or makes (unexpected) turns during its movement over the field. This is mainly achieved by means of the step of determining the real-time position of the device just before or at the moment that the liquid is to be dispensed to the area of the field to be sprayed.

In an embodiment of the method according to the invention, the method further may comprise the steps of identifying, by the detection system, plants in the detection data, associating, by the map generator, each of the plants with a raster element in the raster-based representation, and calculating, for each raster element and the plants detected, a quantity of liquid to be dispensed to said raster element.

Identifying the specific plants and the number of each plant in more detail allows a more specific calculation of the liquid that is required to be dispensed to that specific area on a specific time (i.e. the passage of the agricultural device). This provides the advantage that a real-time, high detail dispensing method is achieved, thus leading to an effective dispensing from both cost and environmental perspective.

In an embodiment of the method according to the invention, the method may additionally comprise one or more of the steps of determining the number and/or type of plants detected, wherein the step of calculating includes adapting the quantity of liquid to be dispensed to the number and/or type of plants detected, sending, using a communication device, to a remote device, one or more of: detection data, position data, the raster-based representation and/or a quantity to be sprayed on a surface corresponding with a raster element and/or a quantity sprayed on a surface corresponding with a raster element, storing, in the memory, information on the calculated quantity of liquid to be dispensed and a status of dispensing including a 'not-dispensed'-status and a 'dispensed'-status, and updating the stored information from the 'not-dispensed'-status to the 'dispensed'-status after dispensing the quantity of liquid.

The method may comprise communicating data regarding the field to a remote device, which allows the relevant data to be shared and/or analysed without obstructing the functionality of the device during analysing.

In addition, the status of each of the raster-based elements may be determined in high detail by using the method according to the invention. This is mainly due to the fact that, for each time point or time period, it is possible to determine whether a quantity of liquid was dispensed to the area as well as determined the amount of liquid that was dispensed at that time.

It may even contain a maximum amount to dispensed over a given time period, wherein the method comprises determining whether an amount of liquid can be dispensed after comparing the amount of liquid dispensed during a time period and a maximum amount for that time period.

The invention is described in the foregoing as example. It is understood that those skilled in the art are capable of realizing different variants of the invention without actually departing from the scope of the invention. Further advantages, features and details of the invention are elucidated on the basis of preferred embodiments thereof, wherein reference is made to the accompanying drawings, in which:

Figure 1A:
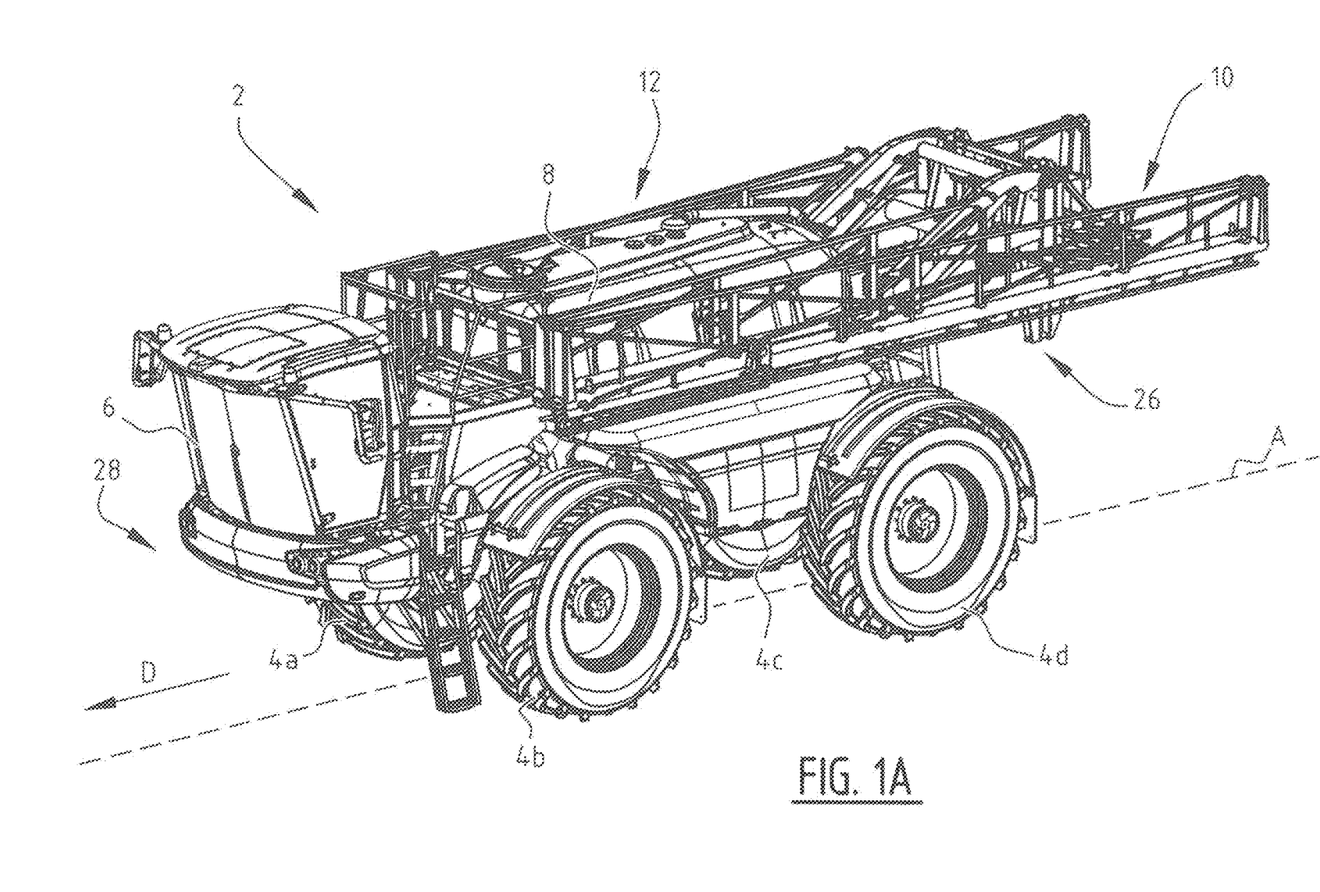
FIG. 1a shows a perspective view of an example of an agricultural device according to the invention.

Agricultural device 2 according to an example of the invention (see FIGS. 1a, 1b) shows self-propelled device 2 that is provided with wheels 4a, 4b, 4c, 4d that are connected to a drive assembly (not shown) and with driver cabin 6 from which an operator can control agricultural device 2. Agricultural device 2 further comprises liquid product supply 8 in the form of storage tank 8 in which liquid product that is to be dispensed over a surface S is provided. In this example, agricultural device 2 comprises two booms 10, 12. Boom 10 is provided with longitudinal supply line 14 and a plurality of nozzles 18a-18x which are distributed along boom 10. Each of the nozzles 18a-18x is fluidly connected with longitudinal supply line 14 of boom 10, which longitudinal supply line 14 has end portion 22 that is fluidly connected with liquid product supply 8.

Boom 12 is provided with longitudinal supply line 16 and a plurality of nozzles 20a-20x which are distributed along boom 12. Each of the nozzles 20a-20x is fluidly connected with longitudinal supply line 16 of boom 12, which longitudinal supply line 16 has end portion 24 that is fluidly connected with liquid product supply 8.

Figure 1B:
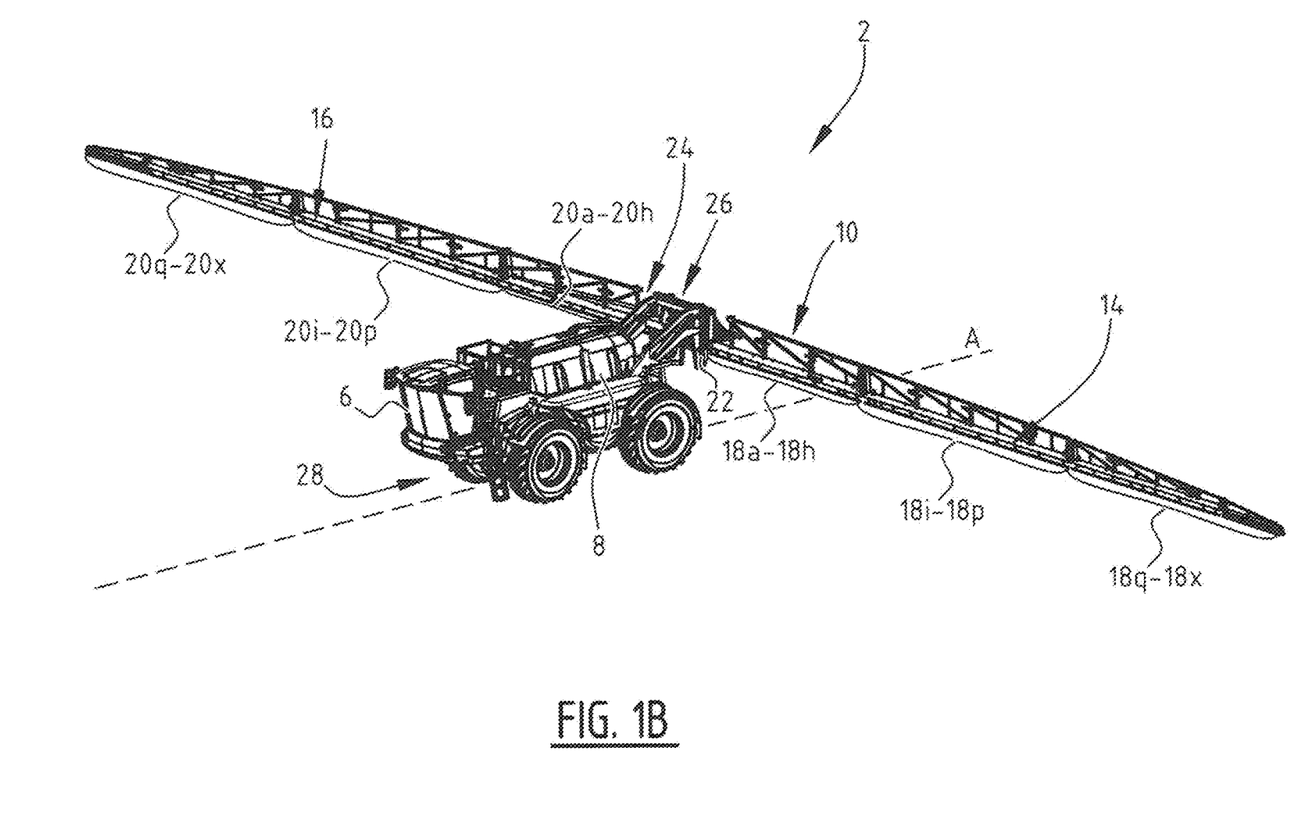
FIG. 1b shows the device of FIG. 1 in which the booms are extended.

In this example, booms 10, 12 each are foldable between a storage position (see FIG. 1a) and a spray position (see FIG. 1b). In the active position, booms 10, 12 extend outwardly on opposite sides from the agricultural device 2 (see FIG. 1b). In this position, booms 10, 12 extend substantially perpendicular to a central axis A, which central axis A extends substantially parallel to moving direction D from rear end 26 to front end 28 of device 2. In the storage position, each of booms 10, 12 is rotated inwardly over an angle of about 90° and folded, such that each of booms 10, 12 extends at least partially parallel to central axis A of agricultural device 2 (see FIG. 1a).

Agricultural device 2 further comprises pressure regulation means 54, which include at least one nozzle control unit 56 to control the opening and closing of one or more of associated nozzles 18a-18x. 20a-20x on respective booms 10, 12.

Figure 3:
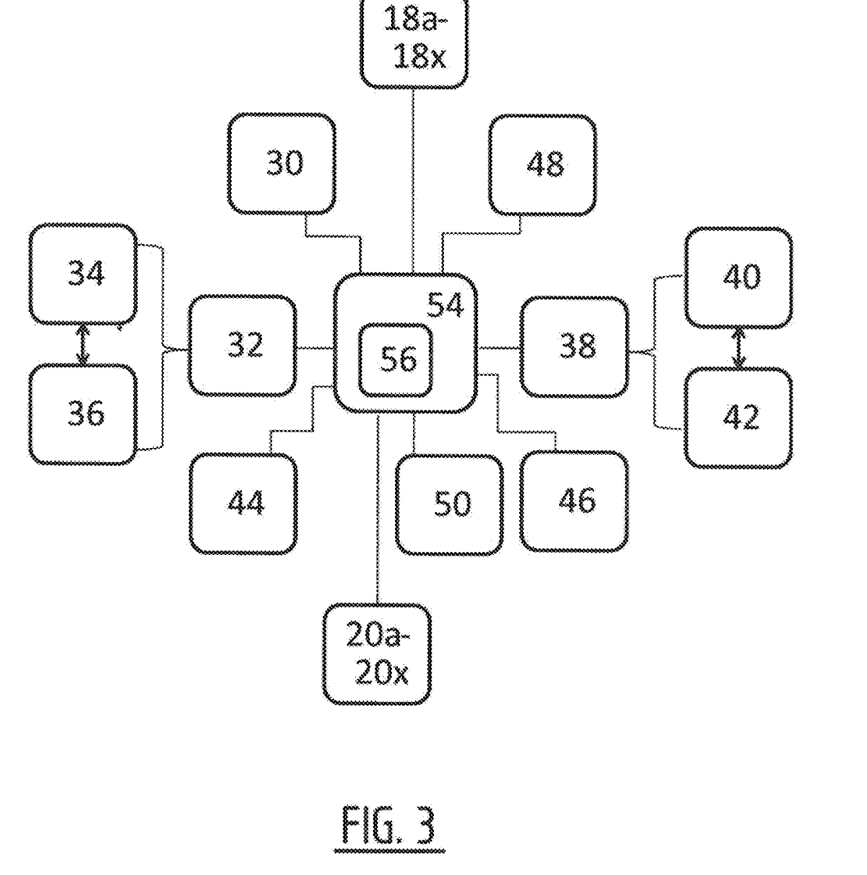
FIG. 3 shows an example of different components of the device.

Agricultural device 2 also comprises positioning system 30 that is configured to provide real-time position data to the device, most notably to pressure regulation unit 54 and/or nozzle control unit 56, that is used in calculating which of nozzles 18a-18x, 20a-20x needs to be operated at a specific time to dispense liquid on the field (see FIG. 3).

Agricultural device 2 in this example also comprises detection system 32 that includes a plurality of cameras 34 and image processor 36 for processing the images captured with cameras 34. The processed images are subsequently sent from image processor 36 or detection system 32 to map generator 38 that generates raster-based representation 40 having plurality of raster elements 42. Each raster element 42 represents a part of surface S of the field (see FIGS. 2a-2c, 3) on which plants 46 grow.

In this example (see FIG. 3) device 2 also comprises communication device 44 that is operatively connected to memory 74 and to pressure regulation unit 54 and, thus, nozzle control unit 56, and user interface 48 that is configured to enable a user or operator to provide input and control device 2. The operator may follow the operations on display 50, on which in this example the specific information on the operation of the different nozzles at different times is represented. Naturally, other information regarding the operation of agricultural device 2 may also be provided on display 50.

Figure 2A:
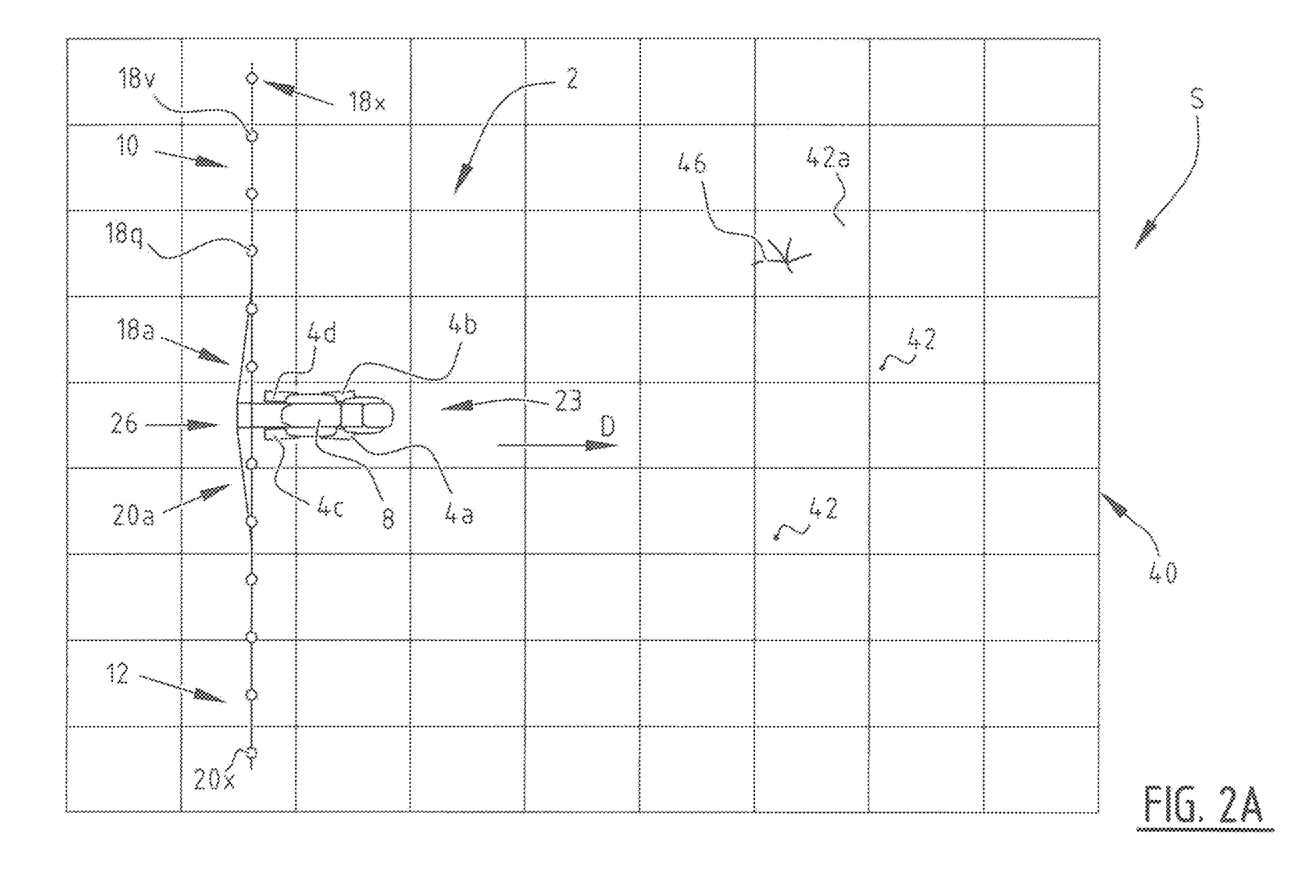
FIGS. 2a-2c show a schematic overview of the device of FIG. 1 during operation.
Figure 2B:
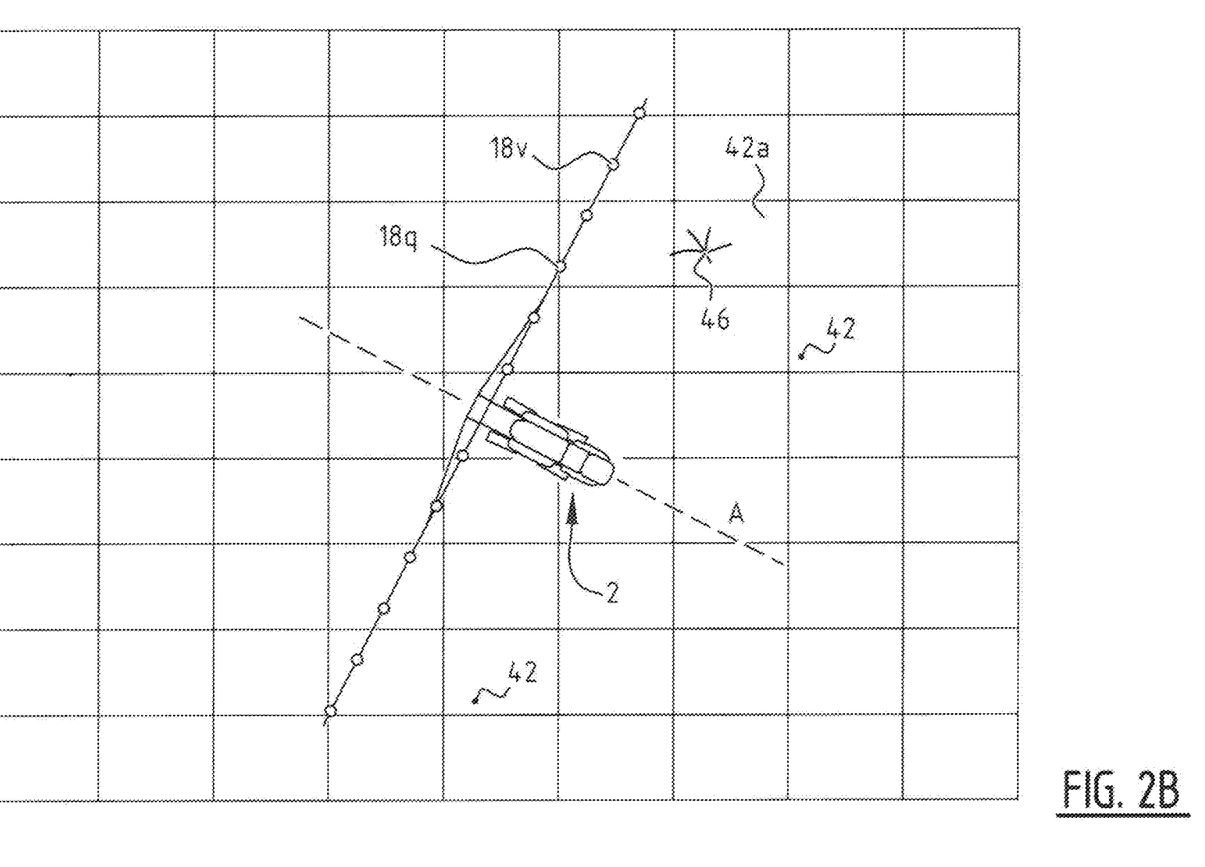
Figure 2C:
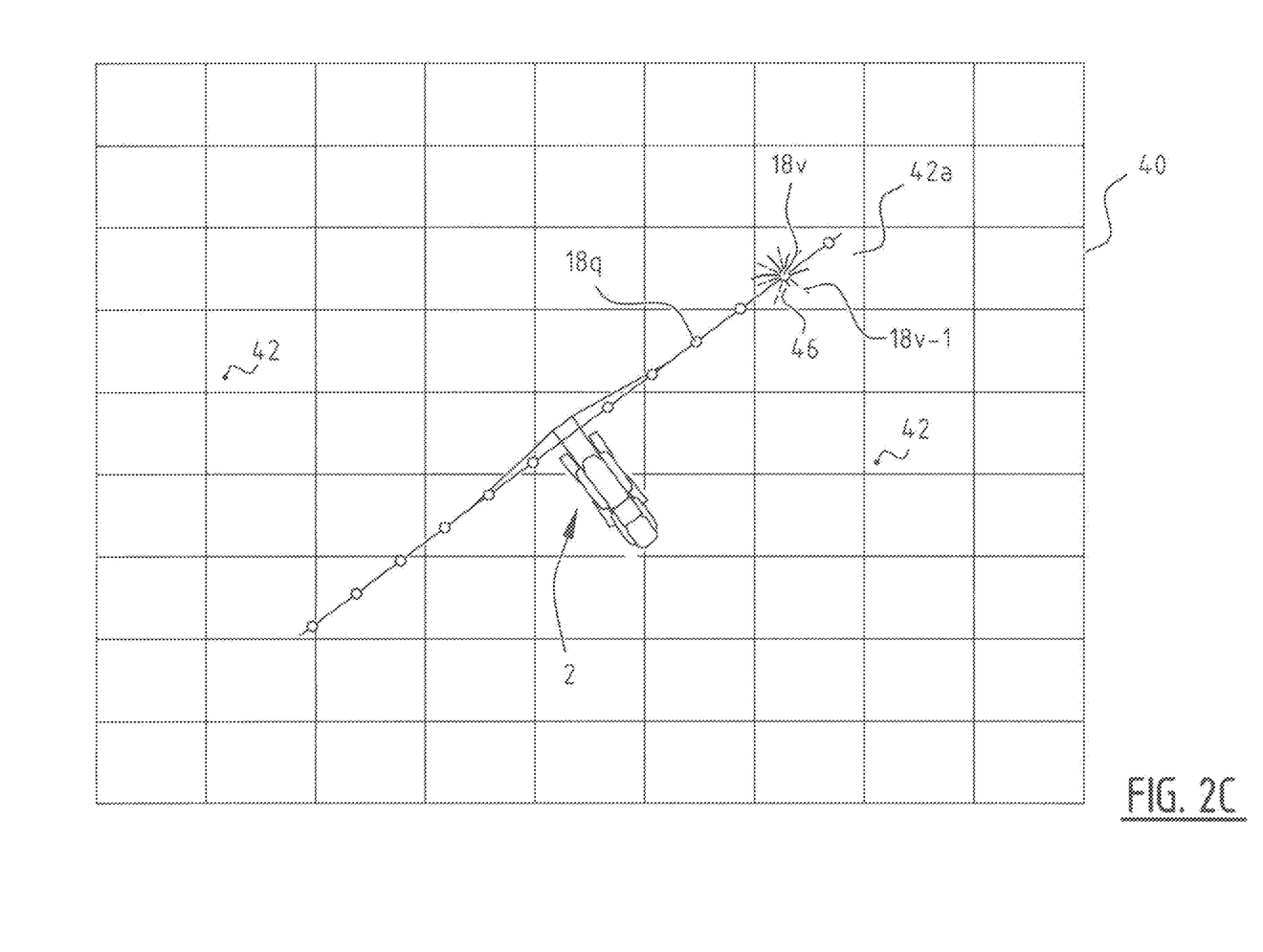

In operation of device 2, of which an example is shown in FIGS. 2a-2c, device 2 moves in direction D along surface S of the field, meanwhile spraying with different nozzles 18a-18x, 20a-20x, on various raster elements 42 of raster based representation 40 that are in practice various sub-parts of field F. It is noted that for clarity the raster elements are visualized much larger as they are in practice. When detection system 32 of device 2, as shown in FIG. 2a, detects plant 46 on raster element 42a a signal is provided from detection system 32 of device 2 to map generator 38, which marks it on raster element 42a of raster based representation 40. Note that at this point nozzle 18q is inline with the plant.

Upon approaching plant 46, which is marked in raster element 42a of raster based representation 40, the operator decides to turn device 2 around, effectively making a turn. As a result, when the position of device 2 changes, effectively bringing nozzle 18q out of line with plant 46 (see FIG. 2b). The real-time position of device 2 and the resulting relative position of device 2 on raster-based representation 40 urges pressure regulation unit 54 and (associated) nozzle control unit 56 to calculate which nozzle needs to be operated to spray raster element 42a, which results in nozzle 18v to be operated to dispense liquid over plant 46 (rather than nozzle 18q which was in line with the plant on detection). Thus, the real-time positioning provided by positioning system 30 in combination with raster-based representation 40 allow plant 46 to be sprayed with high accuracy, since plant 46 now falls within spraying range 18v-1 of nozzle 18v.

The present invention is by no means limited to the above described preferred embodiments thereof. The rights sought are defined by the following clauses within the scope of which many modifications can be envisaged.

The invention claimed is:

1. An agricultural device for dispensing a liquid product to be sprayed over a surface, such as an agricultural field, the device comprising:
   at least one boom comprising a longitudinal supply line for transporting the liquid product and a plurality of nozzles that are positioned along the boom, wherein each nozzle is operatively connected to the longitudinal supply line and has a nozzle spraying range;
   a liquid product supply that is connected to the longitudinal supply line for supplying to the longitudinal supply line the liquid to be sprayed;
   a pressure regulator including at least one nozzle controller arranged and configured for controlling the opening and closing of one or more associated nozzles to dispense liquid on the nozzle dispensing range associated with said nozzles;
   a positioning system arranged and configured to provide position data, wherein the position data comprises a real-time position of the agricultural device and a time stamp;
   a detection system that is positioned on the boom and/or in front of the agricultural device and is configured to provide detection data comprising information on the surface to be sprayed;
   a map generator operatively connected to the detection system and the positioning system for respectively receiving detection data and position data, wherein the map generator is configured to, based on the detection data and position data, generate a raster-based representation of the surface, the representation comprising a number of raster elements, wherein each raster element includes position data associated with that raster element;
   a memory that is configured to store the raster-based representation;
   wherein the pressure regulator and/or the at least one nozzle controller are operatively connected to the positioning system and the memory and are further configured to:
   receive real-time position information from the positioning system;
   select, based on the real-time position information and the raster-based representation, for each raster element a nozzle that is associated with that raster element at a specific time; and
   open the selected nozzle to dispense a quantity of liquid to the surface associated with that raster element at the specific time; and
   wherein the pressure regulator and/or the at least one nozzle controller are further configured to store numeric values, in the memory using a range index, wherein the range index is a natural number taken from a range of N index numbers between zero and N−1 wherein:
   each index number is associated with a distinct block of numeric values;
   range index zero corresponds to a predetermined block of lowest numeric values;
   range index N−1 corresponds to a predetermined block of highest numeric values;
   the range index associated with a numeric value corresponds to the range index of the block the numeric value falls into; and each type of numeric measurement has an associated predetermined range stored in the memory.

2. The agricultural device according to claim 1, wherein the raster element further includes detection data and wherein the pressure regulator and/or the at least one nozzle controller calculate the quantity of liquid to be sprayed for each raster element based on at least the detection data associated with the raster element.

3. The agricultural device according to claim 1, wherein the detection system comprises:
    a plurality of image recording devices positioned along the boom and/or in front of the agricultural device, wherein each of the plurality of image recording devices is configured capture images of a part of the surface; and
    an image processing device connected to the plurality of image recording devices, wherein the image processing device is configured to receive and process images from the plurality of image recording devices, wherein the processing comprises identifying plants, such as crops and weeds, on the captured images;
wherein the map generator is configured to associate each of the identified plants with a raster element in the map.

4. The agricultural device according to claim 3, wherein the image processing device is further configured to:
    compare the identified plants with plant type information stored in the memory to provide each of the identified plants with a plant label; and/or
    determine the number of plants on each of the captured images;
wherein the map generator is configured to include in each of the raster elements the number of plants and/or the plant labels associated with that raster element.

5. The agricultural device according to claim 3, wherein the pressure regulator and/or the at least one nozzle controller are further configured to calculate for each raster element the quantity of liquid to be dispensed to that raster element further based on the number of plants and/or the plant labels associated with the raster element.

6. The agricultural device according to claim 3, wherein each of the plurality of image recording devices is configured to capture images of the surface area that, when viewed in a moving direction of the agricultural device, is positioned in a range of 4-6 meter in front of the boom, and have a width in the range of 2-3 meter.

7. The agricultural device according to claim 3, wherein each of the plurality of image recording devices has a frame rate between 1 to 60 frames per second.

8. The agricultural device according to claim 1, wherein each raster element corresponds to a surface area of the field in the range of 5-50 centimeter by 5-50 centimeter.

9. The agricultural device according to claim 8, wherein the surface area is determined based on or more of a plants characteristic, a distance between nozzles and/or the spraying range.

10. The agricultural device according claim 1, wherein a value of a quantity of liquid is configured to be stored in one byte of the memory by using a predetermined range with N set to 256.

11. The agricultural device according to claim 1, further comprising a communication device that is configured to send to a remote device, one or more of:
    detection data;
    position data;
    the raster-based representation; and/or
    a quantity to be sprayed on a surface corresponding with a raster element and/or a quantity sprayed on a surface corresponding with a raster element.

12. The agricultural device according to claim 1, wherein the pressure regulator and/or the at least one nozzle controller are configured to, after dispensing a quantity of liquid to the surface associated with a raster element, send to the map generator a message including information on the quantity of liquid dispensed to the surface associated with the raster element, and wherein the map generator is configured to include said information on the quantity in said raster element.

13. The agricultural device according to claim 1, further comprising an user interface that is operatively connected to the memory, wherein the interface is configured to enable a user to select a specific type of plant to be sprayed from a list of plants stored in the memory, and wherein each plant type on the list of plants is associated with a quantity of liquid adapted to that plant type.

14. The agricultural device according to claim 1, further comprising a display configured to display one or more of dispensing information, wherein dispensing information comprises the rasterized representation of the surface and quantity of liquid to be sprayed.

15. A method for dispensing a liquid product to be sprayed over a surface, such as an agricultural field, the method comprising:
    providing an agricultural device comprising:
        at least one boom comprising a longitudinal supply line for transporting the liquid product and a plurality of nozzles that are positioned along the boom, wherein each nozzle is operatively connected to the longitudinal supply line and has a nozzle spraying range;
        a liquid product supply that is connected to the longitudinal supply line for supplying to the longitudinal supply line the liquid to be sprayed;
        a pressure regulator including at least one nozzle controller arranged and configured for controlling the opening and closing of one or more associated nozzles to dispense liquid on the nozzle dispensing range associated with said nozzles;
        a positioning system that is configured to provide position data, wherein the position data comprises a real-time position of the agricultural device and a time stamp;
        a detection system that is positioned on the boom and/or in front of the agricultural device and is configured to provide detection data comprising information on the surface to be sprayed;
        a map generator that is operatively connected to the detection system and the positioning system for respectively receiving detection data and position data, wherein the map generator is configured to, based on the detection data and position data, generate a raster-based representation of the surface, the representation comprising a number of raster elements, wherein each raster element includes position data associated with that raster element;
        a memory that is configured to store the raster-based representation;
    wherein the pressure regulator and/or the at least one nozzle controller are operatively connected to the positioning system and the memory and are further configured to:
        receive real-time position information from the positioning system;

select, based on the real-time position information and the raster-based representation, for each raster element a nozzle that is associated with that raster element at a specific time; and open the selected nozzle to dispense a quantity of liquid to the surface associated with that raster element at the specific time; and wherein the pressure regulator and/or the at least one nozzle controller are further configured to store numeric values, in the memory using a range index, wherein the range index is a natural number taken from a range of N index numbers between zero and N−1 wherein:

each index number is associated with a distinct block of numeric values;

range index zero corresponds to a predetermined block of lowest numeric values;

range index N−1 corresponds to a predetermined block of highest numeric values;

the range index associated with a numeric value corresponds to the range index of the block the numeric value falls into; and each type of numeric measurement has an associated predetermined range stored in the memory;

moving the agricultural device over a field to be sprayed;

generating, by the positioning system, position data comprising a real-time position and a time stamp;

generating, by the detection system, detection data comprising information on the surface to be sprayed;

generating, by the map generator and based on the position information and the detection information, a raster-based representation of the surface, the representation comprising a number of raster elements, wherein each raster element includes position data associated with that raster element;

selecting, by the pressure regulator and/or the at least one nozzle controller, based on the real-time position information and the raster-based representation, for each raster element a nozzle that is associated with that raster element at a specific time; and opening for a predetermined time period the selected nozzle to dispense a quantity of liquid to the surface associated with that raster element at the specific time.

16. The method according to claim 15, further comprising:

identifying, by the detection system, plants in the detection data;

associating, by the map generator, each of the plants with a raster element in the raster-based representation; and calculating, for each raster element and the plants detected, a quantity of liquid to be dispensed to said raster element.

17. The method according to claim 16, additionally comprising at least one of:

determining the number and/or type of plants detected, wherein the step of calculating includes adapting the quantity of liquid to be dispensed to the number and/or type of plants detected;

sending, using a communication device, to a remote device, one or more of: detection data, position data, the raster-based representation and/or a quantity to be sprayed on a surface corresponding with a raster element and/or a quantity sprayed on a surface corresponding with a raster element;

storing, in the memory, information on the calculated quantity of liquid to be dispensed and a status of dispensing including a 'not-dispensed'-status and a 'dispensed'-status, and updating the stored information from the 'not-dispensed'-status to the 'dispensed'-status after dispensing the quantity of liquid.

18. An agricultural device for dispensing a liquid product to be sprayed over a surface, such as an agricultural field, the device comprising:

at least one boom comprising a longitudinal supply line for transporting the liquid product and a plurality of nozzles that are positioned along the boom, wherein each nozzle is operatively connected to the longitudinal supply line and has a nozzle spraying range;

a liquid product supply that is connected to the longitudinal supply line for supplying to the longitudinal supply line the liquid to be sprayed;

a pressure regulator including at least one nozzle controller arranged and configured for controlling the opening and closing of one or more associated nozzles to dispense liquid on the nozzle dispensing range associated with said nozzles;

a positioning system that is configured to provide position data, wherein the position data comprises a real-time position of the agricultural device and a time stamp;

a detection system that is positioned on the boom and/or in front of the agricultural device and is configured to provide detection data comprising information on the surface to be sprayed;

a map generator that is operatively connected to the detection system and the positioning system for respectively receiving detection data and position data, wherein the map generator is configured to, based on the detection data and position data, generate a raster-based representation of the surface, the representation comprising a number of raster elements, wherein each raster element includes position data associated with that raster element;

a memory that is configured to store the raster-based representation;

wherein the pressure regulator and/or the at least one nozzle controller are operatively connected to the positioning system and the memory and are further configured to:

receive real-time position information from the positioning system;

select, based on the real-time position information and the raster-based representation, for each raster element a nozzle that is associated with that raster element at a specific time; and open the selected nozzle to dispense a quantity of liquid to the surface associated with that raster element at the specific time, wherein the detection system comprises:

a plurality of image recording devices positioned along the boom and/or in front of the agricultural device, wherein each of the plurality of image recording devices is configured capture images of a part of the surface; and an image processing device connected to the plurality of image recording devices, wherein the image processing device is configured to receive and process images from the plurality of image recording devices, wherein the processing comprises identifying plants, such as crops and weeds, on the captured images;

wherein the map generator is configured to associate each of the identified plants with a raster element in the map; and wherein the pressure regulator and/or the at least one nozzle controller are further configured to store numeric values, in the memory using a range index, wherein the range index is a natural number taken from a range of N index numbers between zero and N−1 wherein:

each index number is associated with a distinct block of numeric values;

range index zero corresponds to a predetermined block of lowest numeric values;

range index N−1 corresponds to a predetermined block of highest numeric values;

the range index associated with a numeric value corresponds to the range index of the block the numeric value falls into; and each type of numeric measurement has an associated predetermined range stored in the memory.

19. The agricultural device according to claim 18, wherein the image processing device is further configured to:

compare the identified plants with plant type information stored in the memory to provide each of the identified plants with a plant label; and/or determine the number of plants on each of the captured images;

wherein the map generator is configured to include in each of the raster elements the number of plants and/or the plant labels associated with that raster element, and wherein the pressure regulator and/or the at least one nozzle controller are further configured to calculate for each raster element the quantity of liquid to be dispensed to that raster element further based on the number of plants and/or the plant labels associated with the raster element.

* * * * *